United States Patent
Yang et al.

(10) Patent No.: US 9,815,946 B2
(45) Date of Patent: Nov. 14, 2017

(54) STABILIZED POLY(ARYLENE ETHER) COMPOSITIONS AND METHODS OF MAKING THEM

(71) Applicant: ExxonMobil Chemical Patents Inc., Baytown, TX (US)

(72) Inventors: Yong Yang, Kingwood, TX (US); Carlos R. Lopez-Barron, Houston, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 0 days.

(21) Appl. No.: 14/900,679

(22) PCT Filed: Jul. 15, 2014

(86) PCT No.: PCT/US2014/046679
§ 371 (c)(1),
(2) Date: Dec. 22, 2015

(87) PCT Pub. No.: WO2015/023381
PCT Pub. Date: Feb. 19, 2015

(65) Prior Publication Data
US 2016/0130395 A1     May 12, 2016

Related U.S. Application Data

(60) Provisional application No. 61/866,702, filed on Aug. 16, 2013, provisional application No. 61/907,463, filed on Nov. 22, 2013.

(51) Int. Cl.
*C08G 81/02* (2006.01)
*C08G 69/48* (2006.01)
*C08G 65/38* (2006.01)

(52) U.S. Cl.
CPC ........... *C08G 81/028* (2013.01); *C08G 65/38* (2013.01); *C08G 69/48* (2013.01); *C08G 81/025* (2013.01)

(58) Field of Classification Search
CPC .................................................... C08G 81/025
(Continued)

(56) References Cited

U.S. PATENT DOCUMENTS 3,402,144 A * 9/1968 Hay ..................... C08G 65/485
521/30
3,522,326 A * 7/1970 Hay ..................... C08F 283/06
525/391
(Continued)

FOREIGN PATENT DOCUMENTS

EP  0 025 200 A   3/1931
EP  0 083 098 A   7/1983
(Continued)

OTHER PUBLICATIONS

Diez-Pascual, A. M. et al., "Tuning the properties of carbon fiber-reinforced poly(phenylene sulphide) laminates via incorporation of inorganic nanoparticles," Polymer, vol. 53, 2012, pp. 2369-2378.
(Continued)

*Primary Examiner* — Mike M Dollinger
(74) *Attorney, Agent, or Firm* — Kevin M. Faulkner

(57) ABSTRACT

Disclosed herein is a method to stabilize a poly(arylene ether) comprising combining a neat or diluted poly(arylene ether) with a vinyl or vinylidene-terminated polyolefin at a temperature of at least 80° C. to form heated reaction components; combining a Brønsted acid or Lewis acid with the heated reaction components; and isolating a polyolefin-poly(arylene ether) copolymer composition.

4 Claims, 6 Drawing Sheets

(58) Field of Classification Search
USPC .......................................................... 525/534
See application file for complete search history.

(56) References Cited

U.S. PATENT DOCUMENTS

| | | | | |
|---|---|---|---|---|
| 4,097,556 | A * | 6/1978 | Toyama | C08F 257/02 525/68 |
| 4,242,263 | A * | 12/1980 | Lee, Jr. | C08L 71/123 524/141 |
| 4,341,879 | A | 7/1982 | Sugio et al. | |
| 4,460,743 | A * | 7/1984 | Abe | C08G 81/025 525/63 |
| 4,463,137 | A * | 7/1984 | Bodolus | C08F 279/02 525/242 |
| 4,517,341 | A * | 5/1985 | White | C08G 81/025 523/332 |
| 4,564,656 | A * | 1/1986 | Cooper | C08F 285/00 525/152 |
| 4,863,997 | A | 9/1989 | Shibuya et al. | |
| 5,132,478 | A | 7/1992 | Ho et al. | |
| 5,143,981 | A * | 9/1992 | Abe | C08K 5/01 525/391 |
| 5,169,416 | A * | 12/1992 | Pedretti | C08G 65/485 525/390 |
| 5,206,301 | A | 4/1993 | Hattori et al. | |
| 5,229,456 | A | 7/1993 | Ilenda et al. | |
| 5,244,971 | A | 9/1993 | Jean-Marc | |
| 5,252,677 | A * | 10/1993 | Tomita | C08F 8/00 525/333.7 |
| 5,262,477 | A * | 11/1993 | Kasai | C08G 18/4879 525/397 |
| 5,328,956 | A | 7/1994 | Hasebe et al. | |
| 5,356,992 | A * | 10/1994 | Cottis | C08G 81/025 525/132 |
| 5,357,022 | A * | 10/1994 | Banach | C08G 65/44 525/393 |
| 5,405,911 | A | 4/1995 | Handlin, Jr. et al. | |
| 5,541,262 | A | 7/1996 | Brichta et al. | |
| 6,117,962 | A | 9/2000 | Weng et al. | |
| 6,348,256 | B1 * | 2/2002 | Rabasco | B41M 5/52 428/32.28 |
| 6,602,954 | B1 | 8/2003 | Lin | |
| 6,872,777 | B2 | 3/2005 | Adedeji et al. | |
| 6,875,812 | B1 * | 4/2005 | Akiyama | C08F 297/044 525/133 |
| 6,962,965 | B2 * | 11/2005 | Yeager | C08G 18/4879 525/391 |
| 7,022,765 | B2 | 4/2006 | Adedeji et al. | |
| 7,541,399 | B2 * | 6/2009 | Yoshida | C08L 25/06 524/127 |
| 7,862,872 | B2 | 1/2011 | Baumert et al. | |
| 8,461,261 | B2 | 6/2013 | Nomura et al. | |
| 9,273,163 | B2 | 3/2016 | Crowther et al. | |
| 9,527,933 | B2 | 12/2016 | Kulkarni et al. | |
| 2002/0165317 | A1 | 11/2002 | Adedeji et al. | |
| 2003/0162902 | A1 | 8/2003 | Singh et al. | |
| 2004/0214952 | A1 | 10/2004 | Kannan et al. | |
| 2005/0058686 | A1 * | 3/2005 | Van Dyke | A61L 27/34 424/426 |
| 2008/0234436 | A1 | 9/2008 | Sakamoto et al. | |
| 2009/0270296 | A1 | 10/2009 | Patil et al. | |
| 2009/0318644 | A1 | 12/2009 | Brant et al. | |
| 2011/0152471 | A1 | 6/2011 | Kamalakaran et al. | |
| 2012/0245293 | A1 | 9/2012 | Crowther et al. | |
| 2012/0245300 | A1 | 9/2012 | Crowther et al. | |
| 2013/0030135 | A1 | 1/2013 | Hagadorn et al. | |
| 2013/0267664 | A1 | 10/2013 | Jeol | |
| 2013/0345336 | A1 | 12/2013 | Lopitaux | |
| 2016/0130395 | A1 * | 5/2016 | Yang | C08G 81/028 525/534 |

FOREIGN PATENT DOCUMENTS

| | | |
|---|---|---|
| EP | 0 138 599 A | 4/1985 |
| EP | 0 959 096 A | 11/1999 |
| JP | S50 126800 | 10/1975 |
| JP | 2615925 B | 6/1997 |
| JP | 2004/107384 A | 4/2004 |
| KR | 2010-0021887 A | 2/2010 |
| WO | 87/03603 A | 6/1987 |
| WO | 2007/136460 A | 11/2007 |
| WO | 2009/155471 A | 12/2009 |
| WO | 2010/030478 | 3/2010 |

OTHER PUBLICATIONS

Flat, J.J., "New comb-like nanostructured copolymers: A promising route towards new industrial applications," Polymer Degradation and Stability, vol. 92, 2007, pp. 2278-2286.

Ikkala, O.T. et al., "Effects of Compatibilization on Fractionated Crystallization of PA6/PP Blends," Journal of Applied Polymer Science, vol. 49, 1993, pp. 1165-1174.

Lai, S-M. et al., "Preparation and Properties of Melt-Mixed Metallocene Polyethylene/Silica Nanocomposites," Polymer Engineering and Science, 2011, pp. 434-444.

Sun, Y-J. et al., "In situ compatibilization of polyolefin and polystyrene using Friedel-Crafts alkylation through reactive extrusion," Polymer, vol. 39, No. 11, 1998, pp. 2201-2208.

* cited by examiner

STABILIZED POLY(ARYLENE ETHER) COMPOSITIONS AND METHODS OF MAKING THEM

PRIORITY CLAIM TO RELATED APPLICATIONS

The present Application is a National Stage Application of International Application No. PCT/US2014/046679, filed Jul. 15, 2014, which is related to "Polyamide-Polyolefin Copolymers and Methods of Making Them", filed concurrently herewith, and claims priority to U.S. Ser. No. 61/866,702 filed on Aug. 16, 2013, and U.S. Ser. No. 61/907,463 filed Nov. 22, 2013, all of which are herein incorporated by reference.

FIELD OF THE INVENTION

The invention(s) herein are related in general to high-temperature "stabilized" poly(arylene ether) compositions, and in particular to the reaction product of a poly(arylene ether) and a vinyl or vinylidene terminated polyolefin useful in high-temperature applications.

BACKGROUND

Both polyolefin (PO) and poly(phenylene ether) (PPE) have relatively low thermal and shear stabilities when they are used in pristine alone or in physical blends. PO as the most important commodity plastic typically sees viscosity changes when subjected at 120° C. or above use temperatures for a certain period of time as the result of molecular structure changes under thermal or thermo-oxidative conditions. By empirical definition, an engineering thermoplastic (ETP) can maintain mechanical and dimensional stability above 100° C. and below 0° C., and therefore can be used as light-weight and high-performance structural material, replacing metals, wood, glass, or ceramics. PPE as one of the important ETPs boasts excellent dimensional stability but the pristine PPE is intrinsically instable at high temperatures and under high shear rates. This instability is a result of its reactive chain end from the manufacturing process. The common industrial process to mitigate its instability is to cap the reactive chain end with other functional groups to reduce the reactivity. The chain end treated PPE would then desirably survive processing conditions and applications. However most known functional groups will come off at higher temperatures, which compromises PPE's other outstanding properties and limits its broader application as an ETP. What is needed is a way to improve the stability of PPE's so that they can be thermally formed into such articles as "under the hood" automotive components that require a high degree of thermal stability.

SUMMARY

Disclosed herein is a method to stabilize a poly(arylene ether) copolymers ("PAE") comprising combining a neat or diluted PAE with a vinyl or vinylidene-terminated polyolefin ("VTPO") at a temperature of at least 80 or 100 or 120° C. to form heated reaction components; combining a Brønsted acid or Lewis acid with the heated reaction components; and isolating a polyolefin-poly(arylene ether) copolymer ("PO-PAE").

Also disclosed is a stabilized polyolefin-poly(arylene ether) copolymer composition comprising a PAE group, preferably a poly(phenylene ether) group, modified as in compounds of the general formula:

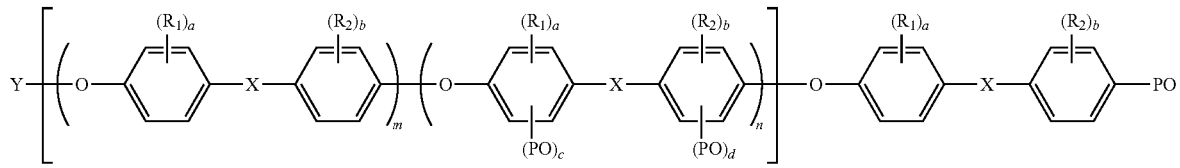

wherein Y is a chain end group with or without treatment;
X is, independently, an oxygen, sulfur, nitrogen, phosphorus, silicon or carbon containing moiety;
a and b are independently 0, 1, 2, 3, or 4, and (a+b) is less than 8;
c and d are independently 0, 1, 2, 3, or 4, and (c+d) is at least 1;
n is at least 1 (or within a range from 1 to 200), m is at least 1 (or within a range from 1 to 199), and (m+n)=k, where k is within a range from 1 to 200;
$R^1$ and $R^2$ groups are independently selected from hydrogen, aryl, substituted aryl, $C_1$ to $C_{10}$ alkyl groups, hydroxyl, halogen, or $C_1$ to $C_{10}$ alkoxy; and
each PO is independently a polyolefin group.

DETAILED DESCRIPTION

Figure 1:
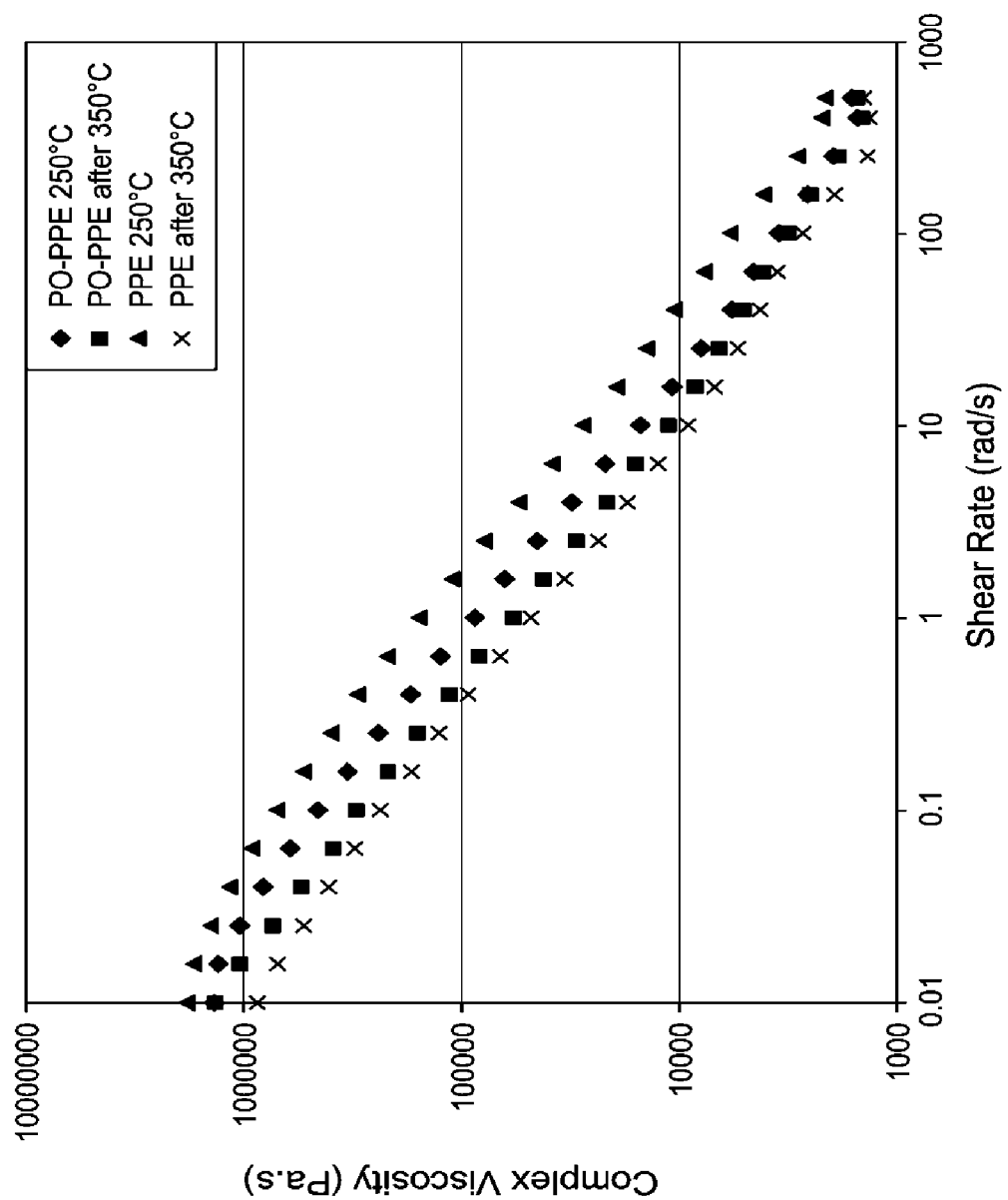
FIG. 1 is a graphical representation of the Complex Viscosity of PPE and the inventive PPE-PO compositions as a function of Shear Rate, demonstrating the stability of the inventive composition by its lack of change upon high-temperature treatment.
Figure 2:
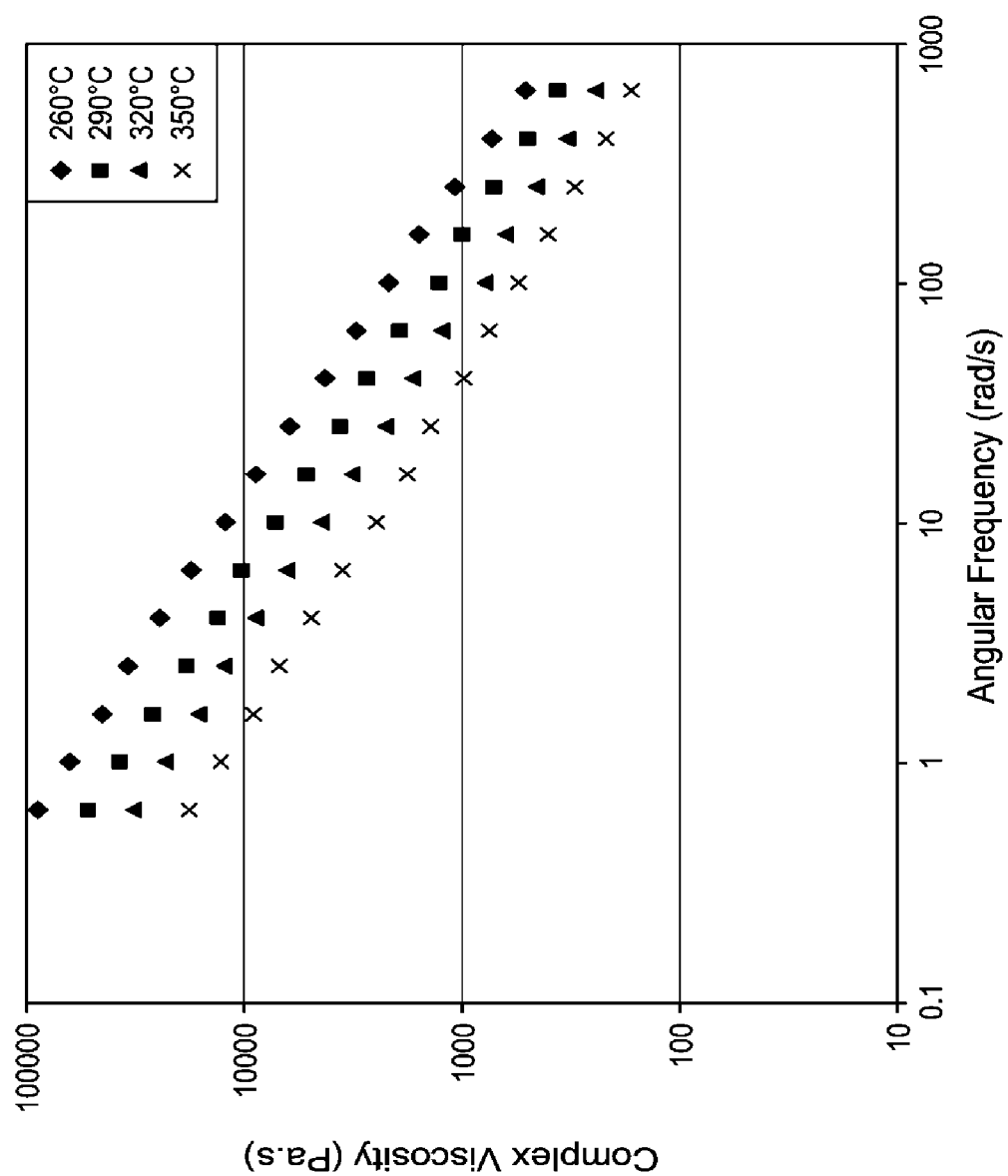
FIG. 2 is a graphical representation of the Complex Viscosity of the inventive PO-PAE compositions as a function of Angular Frequency.
Figure 3:
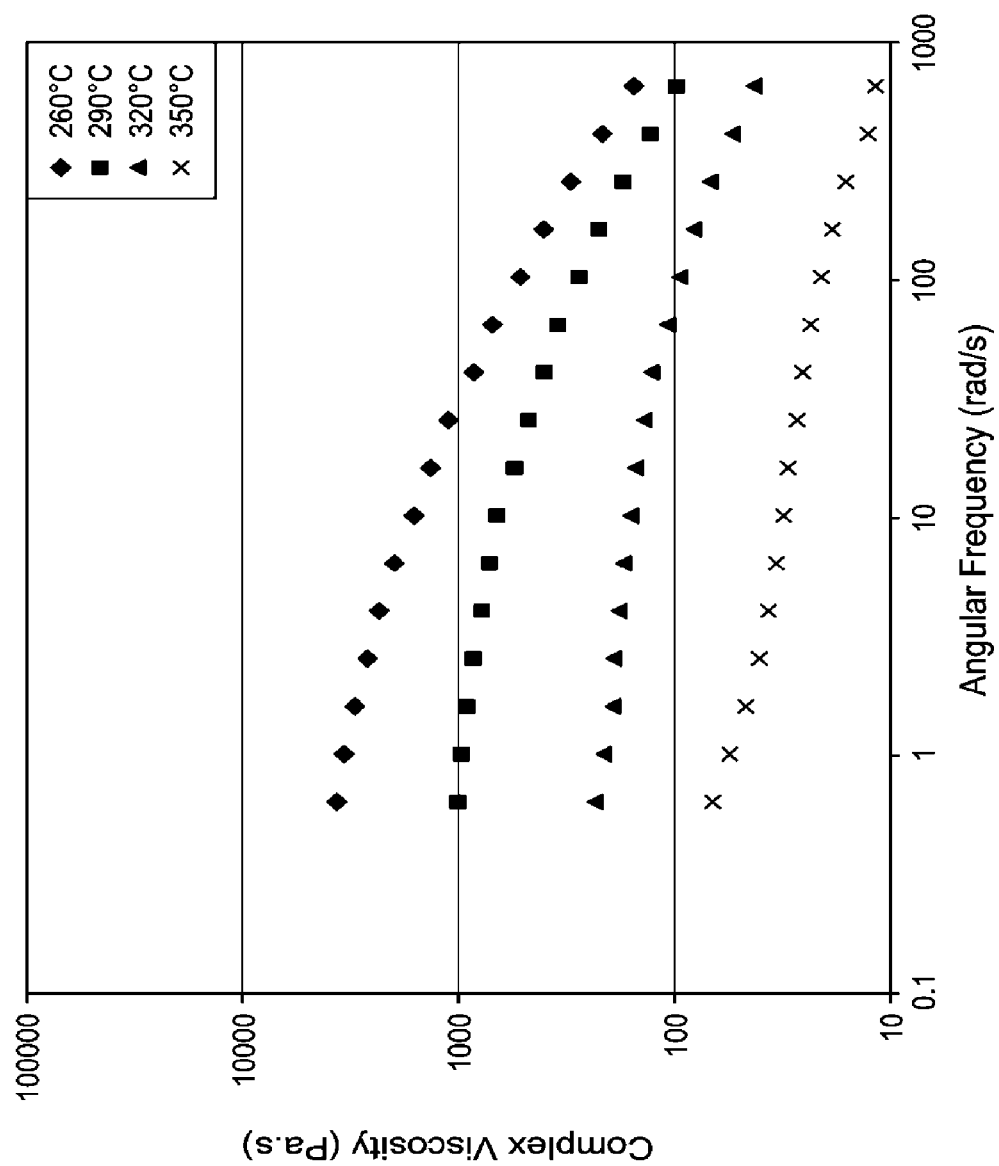
FIG. 3 is a graphical representation of the Complex Viscosity of a PPE/Polystyrene (HIPS) blend showing its relative instability when exposed to high-temperature treatment.
Figure 4:
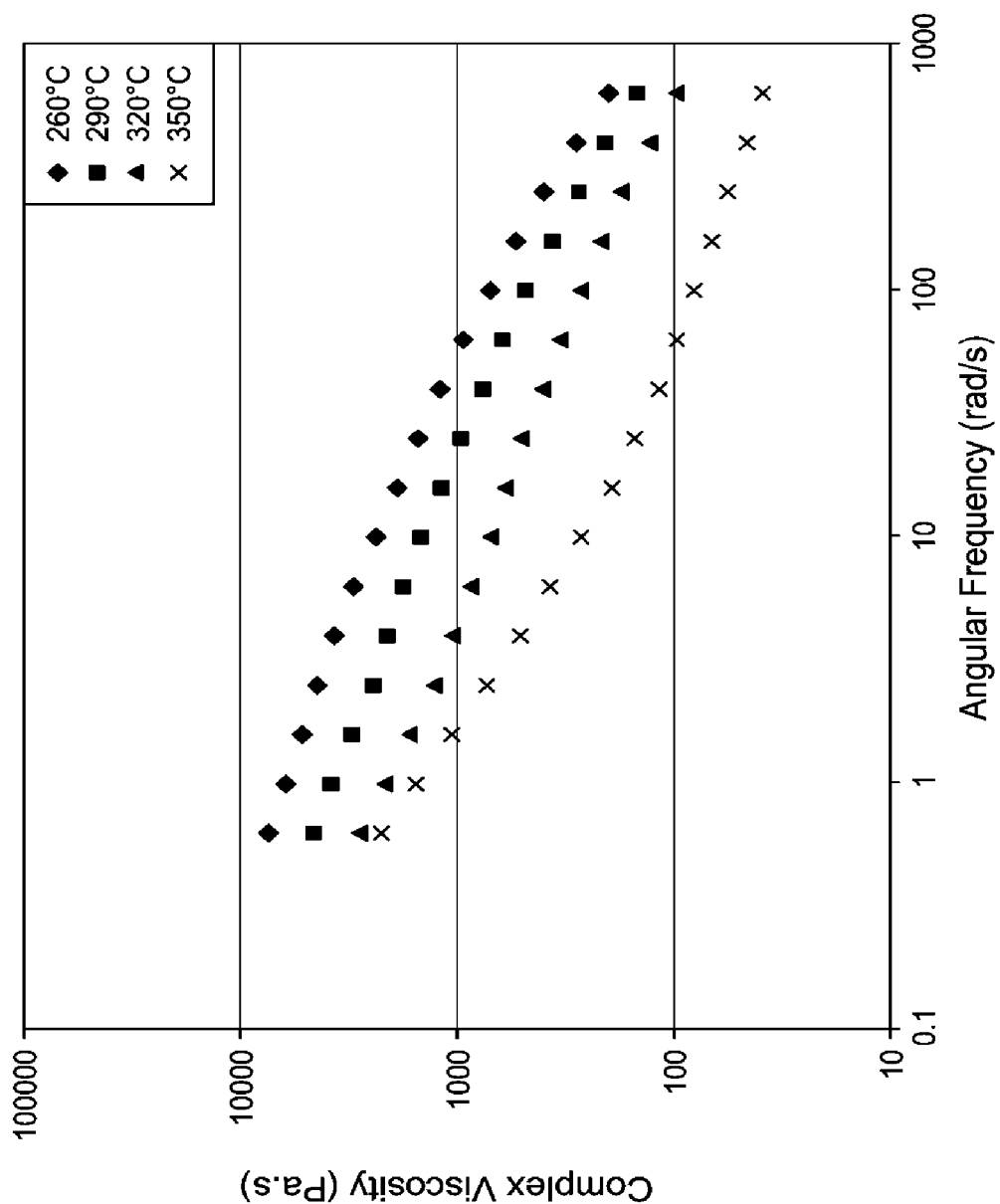
FIG. 4 is a graphical representation of the Complex Viscosity of a PPE/Polypropylene/Styrene-isoprene-styrene (SIS) copolymer blend showing its relative instability when exposed to high-temperature treatment.

The problem of thermal stability of PAEs is solved at least in part by the use of polyolefins, particularly, POs with one or more unsaturations, as the inexpensive capping agents to react with PAE and block its reactive site, preventing its degradation or reaction at high temperatures. At the same time, PO's thermal and shear stabilities are greatly enhanced by PAE's presence in the copolymer composition. The copolymer resin demonstrates better thermal and shear stabilities than each polymer component alone. The new process circumvents the use of expensive capping agents and difficult/labile chemistry in the current industrial PAE treatments. By way of example, an exemplary PAE discussed herein is a poly(phenylene ether).

Thus, the invention described herein is directed to a PO-PAE copolymer and the method of making the copolymer. In particular, the composition can be described as the reaction product of a VTPO and a PAE. The inventive reaction product, the stabilized PO-PAE, can be described by the following formula (I):

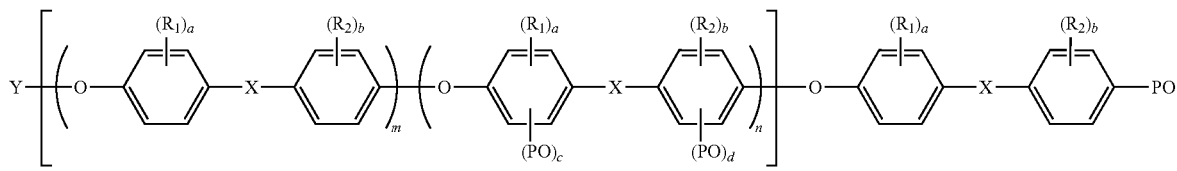

wherein Y is a chain end group with or without treatment;
X is, independently, an oxygen, sulfur, nitrogen, phosphorus, silicon, or carbon containing moiety;
a and b are independently 0, 1, 2, 3, or 4, and (a+b) is less than 8;
c and d are independently 0, 1, 2, 3, or 4, and (c+d) is at least 1;
n is at least 1 (or within a range from 1 to 200), m is at least 1 (or within a range from 1 to 199), and (m+n)=k, where k is within a range from 1 to 200;
$R^1$ and $R^2$ groups are independently selected from hydrogen, aryl, substituted aryl, $C_1$ to $C_{10}$ alkyl groups, hydroxyl, halogen, or $C_1$ to $C_{10}$ alkoxy; and
each PO is independently a polyolefin group, wherein when there is more than one PO group, each of which can be the same or different; for example, one PO may be an EP copolymer, and another PO may be a PE.

The "Y" group is a reactive moiety capable of forming a covalent bond with a vinyl or vinylidene group. In any embodiment, Y is preferably selected from the group consisting of hydrogen, alkyl, aryl, arylalkyl, alkenyl, aminoalkyl, alkylketo, carbonyl, amido, imido, siloxanyl, and silanyl. Also in any embodiment, X is preferably selected from the group consisting of oxygen, sulfur, alkyl, arylalkyl, aryl, keto, amino, amido, imido, ureido ($NH_2CONH$—), carbonyl, carbonate, sulfonyl, siloxanyl, silanyl, and is most preferably oxygen or a nitrogen group.

In any embodiment, the polyolefin group is preferably a polyolefin selected from the group consisting of polyethylene, polypropylene, ethylene-propylene copolymer, hexene-ethylene copolymer, octene-ethylene copolymer, and combinations thereof. The PO group may have a number average molecular weight (Mn) within a range of from 5,000 or 10,000 or 20,000 or 30,000 g/mole to 50,000 or 80,000 or 100,000 or 120,000 or 160,000 g/mole. The Mn of the PAE group is preferably within a range of from 1,000 or 2,000 or 5,000 or 10,000 g/mole to 20,000 or 30,000 or 40,000 g/mole.

The general scheme of the reaction, and the inventive product that results, is shown in the following scheme:

wherein the identities of the groups and subscripts are as defined above. The "PO—C=$CH_2$" in the reaction scheme above represents a VTPO described further below.

The reaction to stabilize PAE comprises making the PO-PAE composition by combining a neat or diluted PAE with a VTPO at a temperature of at least 80 or 100 or 120° C. to form heated reaction components, then combining a Brønsted acid or Lewis acid (before or after heating the other components) with the heated reaction components, followed by isolating a PO-PAE after allowing the components to react for some time. By "combining" what is meant is that the claimed components are intimately mixed with one another under conditions to effect a chemical reaction between them such as bond formation. By "isolating" what is meant is that the PO-PAE composition exists in the final product and can be used as found in the reaction product, or it can be concentrated or recovered from other minor reaction products (such as the acid by-products and unreacted VTPO and PAE). In any case, the VTPO is selected from the group consisting of vinyl or vinylidene-terminated polyethylene, vinyl or vinylidene-terminated polypropylene, vinyl or vinylidene-terminated ethylene-propylene copolymer, vinyl or vinylidene-terminated hexene-ethylene copolymer, vinyl or vinylidene-terminated octene-ethylene copolymer, and combinations thereof.

The Vinyl or Vinylidene Terminated Polyolefin

The vinyl or vinylidene terminated polyolefins useful in the inventive stabilized PAE compositions can be made in any number of ways, and is most desirably a vinyl terminated polyolefin ("VTPO"), but may include some vinylidene terminal groups. Preferably, the VTPO's useful herein are polymers as first described in US 2009-0318644 (referred to therein as vinyl terminated "macromers" or "macromonomers") having at least one terminus ($CH_2CH$—$CH_2$-oligomer or polymer) represented by formula (II):

allylic vinyl end group where the ⁓ represents the oligomer or polymer chain. Preferably, the allyl chain ends are represented by the formula (III):

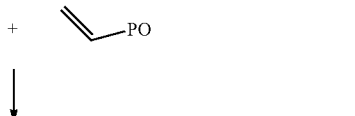

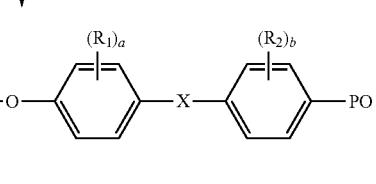

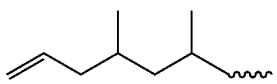
(III)

The amount of allyl chain ends is determined using $^1$H NMR at 120° C. using deuterated 1,1,2,2-tetrachloroethane as the solvent on a 500 MHz machine, and in selected cases confirmed by $^{13}$C NMR. These groups (II) and (III) will react to form a chemical bond with a metal, as mentioned above, to form the M-CH$_2$CH$_2$— polymer. In any case, Resconi has reported proton and carbon assignments (neat perdeuterated 1,1,2,2-tetrachloroethane used for proton spectra, while a 50:50 mixture of normal and perdeuterated 1,1,2,2-tetrachloroethane was used for carbon spectra; all spectra were recorded at 100° C. on a Bruker AM 300 spectrometer operating at 300 MHz for proton and 75.43 MHz for carbon) for vinyl-terminated propylene polymers in Resconi et al, 114 J. AM. CHEM. SOC. 1025-1032 (1992) that are useful herein.

The vinyl-terminated propylene-based polymers may also contain an isobutyl chain end. "Isobutyl chain end" is defined to be an oligomer having at least one terminus represented by the formula (IV):

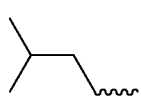
(IV)

Preferably, the isobutyl chain end is represented by one of the following formulae (V):

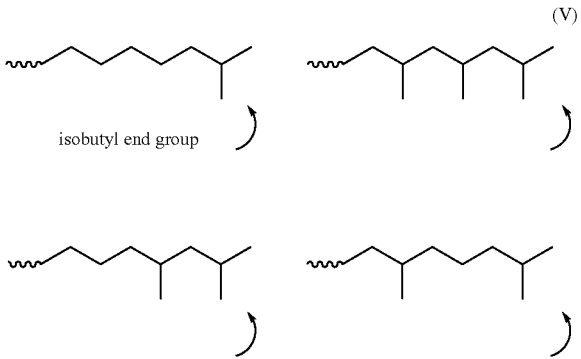
(V)

isobutyl end group

The percentage of isobutyl end groups is determined using $^{13}$C NMR (as described in the example section) and the chemical shift assignments in Resconi for 100% propylene oligomers. Preferably, the vinyl-terminated polymers described herein have an allylic terminus, and at the opposite end of the polymer an isobutyl terminus.

The VTPOs can be made by any suitable means, but most preferably, the VTPOs are made using conventional slurry or solution polymerization processes using a combination of bridged metallocene catalyst compounds (especially bridged bis-indenyl or bridged 4-substituted bis-indenyl metallocenes) with a high-molecular volume (at least a total volume of 1000 Å$^3$) perfluorinated boron activator, for example as described in US 2012-0245299.

The vinyl terminated polyolefin can be any polyolefin having a vinyl-terminal group, as described above, any of which may have a number average molecular weight ($M_n$) of at least 300 g/mole. Preferably, greater than 90 or 94 or 96 wt % of the polyolefin comprises terminal vinyl groups; or within the range of from 50 or 60 wt % to 70 or 80 or 90 or 95 or 98 or 99 wt %. As described above, the vinyl terminated polyolefins preferably have a Mn value of at least 200 or 400 or 1000 or 5000 or 20,000 g/mole, or within the range of from 5,000 or 10,000 or 20,000 or 30,000 g/mole to 50,000 or 80,000 or 100,000 or 120,000 or 160,000 g/mole. The vinyl terminated polyolefins preferably have a weight average molecular weight ($M_w$) value of at least 500 or 800 or 1000 or 5000 or 20,000 g/mole, or within the range of from 500 or 800 or 1000 or 2000 g/mole to 6,000 or 10,000 or 12,000 or 20,000 or 30,000 or 40,000 or 50,000 or 100,000 or 200,000 or 300,000 g/mole. Preferably, the VTPO useful herein is amorphous polypropylene, and desirably has a glass transition temperature ($T_g$) of less than 10 or 5 or 0° C., more preferably, less than −10° C.; or within the range of from 0 or −5 or −10° C. to −30 or −40 or −50° C. or as described herein. The VTPOs are preferably linear, meaning that there is no polymeric or oligomeric branching from the polymer backbone, or described quantitatively, having a branching index "g" (or g'$_{vis\ avg}$) of at least 0.90 or 0.96 or 0.97 or 0.98, wherein the "branching index" is well known in the art and measurable by published means, and the value of such branching index referred to herein is within 10 or 20% of the value as measured by any common method of measuring the branching index for polyolefins as is known in the art such as in US 2013-0090433.

A particularly preferred VTPO is one wherein the vinyl terminated polyolefin is a compound or mixture of compounds represented by the formula (VI):

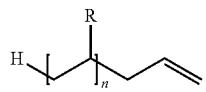
(VI)

wherein each R is selected from hydrogen and C$_1$ to C$_4$ or C$_{10}$ alkyls; and n is an integer from 2 or 4 or 10 or 20 to 50 or 100 or 200 or 500 or 800.

As stated above, the reaction used to stabilize the PAE comprises combining a neat or diluted PAE with a VTPO at a temperature of at least 80 or 100 or 120° C., or within a range from 80 or 100° C. to 120 or 130 or 140° C., to form heated reaction components, then combining a Brønsted acid or Lewis acid with the heated reaction components to obtain the PO-PAE. Desirable acids include such acids as methanesulfonic acid. Some other Brønsted acids that are useful include H$_2$SO$_4$, HCl, HBr, HI, HNO$_3$, CH$_3$COOH, CF$_3$COOH, H$_3$PO$_4$, and H$_2$S. Most preferred acids are organic (C$_1$ to C$_{20}$) carboxylic or sulfonic acids. Lewis acids are also useful. Categories of useful Lewis acids include those such as (1) most all cations, such as Al$^{3+}$, Cu$^{2+}$, Fe$^{2+}$, Fe$^{3+}$, Ti$^{2+}$, Sn$^{2+}$, etc.; (2) any substance with an incomplete octet of electrons, such as BF$_3$, AlF$_3$, AlCl$_3$, etc.; (3) any substance with central atom having more than 8 valence shell electrons, such as SiBr$_4$, SiF$_4$, etc.; and (4) any substance having multiple bonds between two atoms of different electronegativities, such as CO$_2$, SO$_2$, etc. In any case, preferably the reaction components are dissolved in a solvent such as dichlorobenzene where they are contacted with one another and heated to effect the reaction between them.

The PO-PAE composition is "stabilized" in that heating the composition, as when it is melted during extrusion or thermoforming into an article, will not decompose to a substantial degree as characterized in the small decrease in the Complex Viscosity at 230° C. of the polyolefin-poly (arylene ether) copolymer of no greater than 5 or 10 or 15% (or within a range of no greater than 2 or 5% to 10 or 15 or 20%) after being pre-heated at 350° C. (from 0.1 to 10 rad/s) relative to its Complex Viscosity prior to being treated at elevated temperature. This makes the PO-PAE composition useful in such applications as automotive components meant for components near the engine, or "under the hood".

The various descriptive elements and numerical ranges disclosed herein for the inventive methods and compositions can be combined with other descriptive elements and numerical ranges to describe the invention(s); further, for a given element, any upper numerical limit can be combined with any lower numerical limit described herein, including the examples. The features of the invention are demonstrated in the following non-limiting examples.

EXAMPLES

Test Methods

Complex Viscosity:

Dynamic shear melt rheological data was measured with an Advanced Rheometrics Expansion System (ARES) using parallel plates (diameter=25 mm) in a dynamic mode under nitrogen atmosphere. For all experiments, the rheometer was thermally stable at 190° C. for at least 30 minutes before inserting a compression-molded sample of resin onto the parallel plates. To determine the samples viscoelastic behavior, frequency sweeps in the range from 0.01 to 385 rad/s were carried out at 190° C. under constant strain. Depending on the molecular weight and temperature, strains of 10% and 15% were used and linearity of the response was verified. A nitrogen stream was circulated through the sample oven to minimize chain extension or cross-linking during the experiments. A sinusoidal shear strain is applied to the material. If the strain amplitude is sufficiently small the material behaves linearly. It can be shown that the resulting steady-state stress will also oscillate sinusoidally at the same frequency but will be shifted by a phase angle δ (delta) with respect to the strain wave. The stress leads the strain by δ. For purely elastic materials δ=0° (stress is in phase with strain) and for purely viscous materials, δ=90° (stress leads the strain by 90° although the stress is in phase with the strain rate). For viscoelastic materials, 0<δ<90. The shear thinning slope (STS) was measured using plots of the logarithm (base ten) of the dynamic viscosity versus logarithm (base ten) of the frequency. The slope is the difference in the log(dynamic viscosity) at a frequency of 100 s$^{-1}$ and the log(dynamic viscosity) at a frequency of 0.01 s$^{-1}$ divided by 4.

The complex shear viscosity (eta, or η*) versus frequency (omega, or ω) curves were fitted using the Cross model (see, for example, C. W. Macosco, RHEOLOGY: PRINCIPLES, MEASUREMENTS, AND APPLICATIONS, Wiley-VCH, 1994):

$$\eta^* = \frac{\eta_0}{1 + (\lambda\omega)^{1-n}}.$$

The three parameters in this model are: $\eta_0$ is the zero-shear viscosity; λ (lambda), the average relaxation time; and n, the power-law exponent. The zero-shear viscosity is the value at a plateau in the Newtonian region of the flow curve at a low frequency, where the dynamic viscosity is independent of frequency. The average relaxation time corresponds to the inverse of the frequency at which shear-thinning starts. The power-law exponent describes the extent of shear-thinning, in that the magnitude of the slope of the flow curve at high frequencies approaches 1-n on a log(η*)–log (ω) plot. For Newtonian fluids, n=1 and the dynamic complex viscosity is independent of frequency. For the polymers of interest here, n<1, so that enhanced shear-thinning behavior is indicated by a decrease in n (increase in 1-n).

PPE (102 g) (Aldrich, with a typical Mn of 15,000 g/mole and PDI of 2 to 3) and PO with vinyl or vinylidene chain end (18 g) (vinyl-terminated ethylene-hexene copolymer with Mn of 85,000 g/mole and hexene content of 6 wt %) were fully dissolved in 1.2 L ortho-dichlorobenzene (o-DCB) at 120° C. in a 2 L reaction vessel equipped with an overhead mechanical stirrer, followed by addition of 0.61 g methanesulfonic acid (MSA). The reaction was allowed to proceed for 4 hours. The reaction mixture was then cooled down and precipitated to 7.5 L methanol. The precipitated product was filtered, washed with fresh methanol, and dried in 80° C. vacuum oven till constant weight.

The PO-PPE copolymer was compression molded into disk specimens suitable for Small Amplitude Oscillatory Shear Rheometry (SAOS) tests. For comparisons, pristine neat PPE and commercial PPE alloys (PPO™ 731 and PPX™ 7110, both purchased from SABIC IP), were compression molded and tested at the same time.

As illustrated in the FIGS. 1-4, the viscosity decrease of the PO-PPE copolymer between the two frequency sweeps is much less than that of the neat PPE, indicating a higher thermal/shear stability (first frequency sweep at 230° C. of PO-PPE copolymer; second frequency sweep at 230° C. of PO-PPE copolymer after temperature ramping up to 350° C. and cooling down to 230° C.; first frequency sweep at 230° C. of PPE; second frequency sweep at 230° C. of PPE after temperature ramping up to 350° C. and cooling down to 230° C.).

Figure 5:
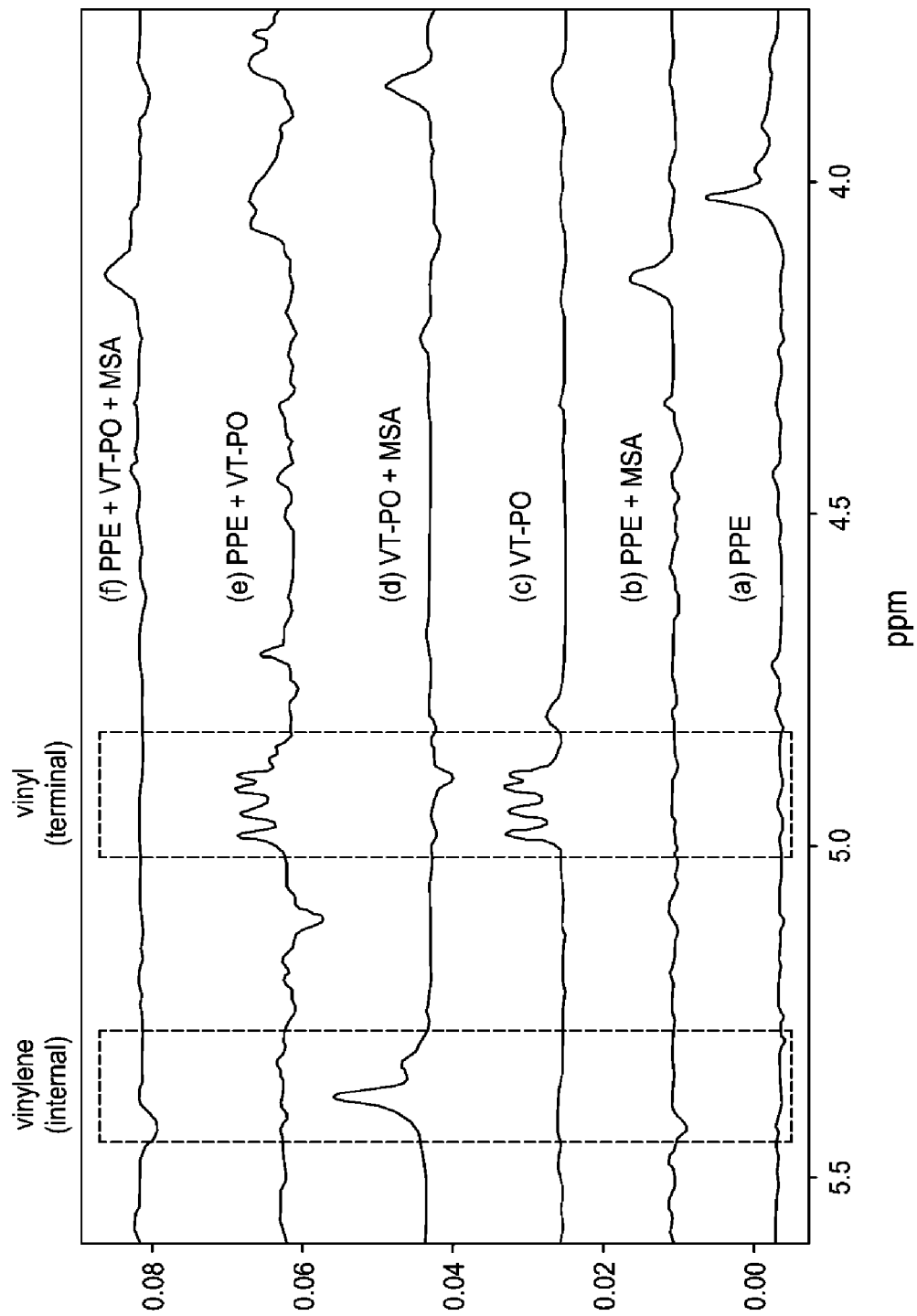
FIG. 5 is a graphical representation of NMR studies suggesting the existence of the PPE-PO composition.

NMR studies suggest the existence of the PPE-PO product. FIG. 5 is a stack of partial NMR spectra: (a) PPE; (b) mixture of PPE and MSA; (c) VTPO; (d) mixture of VTPO and MSA, the terminal vinyl group was isomerized to internal vinylene group; (e) mixture of PPE and VTPO, no reaction happened without acid; and (f) mixture of PPE, VTPO and MSA, under acid, VTPO was attached to PPE through alkylation reaction, indicated by disappearance of terminal vinyl group.

Figure 6:
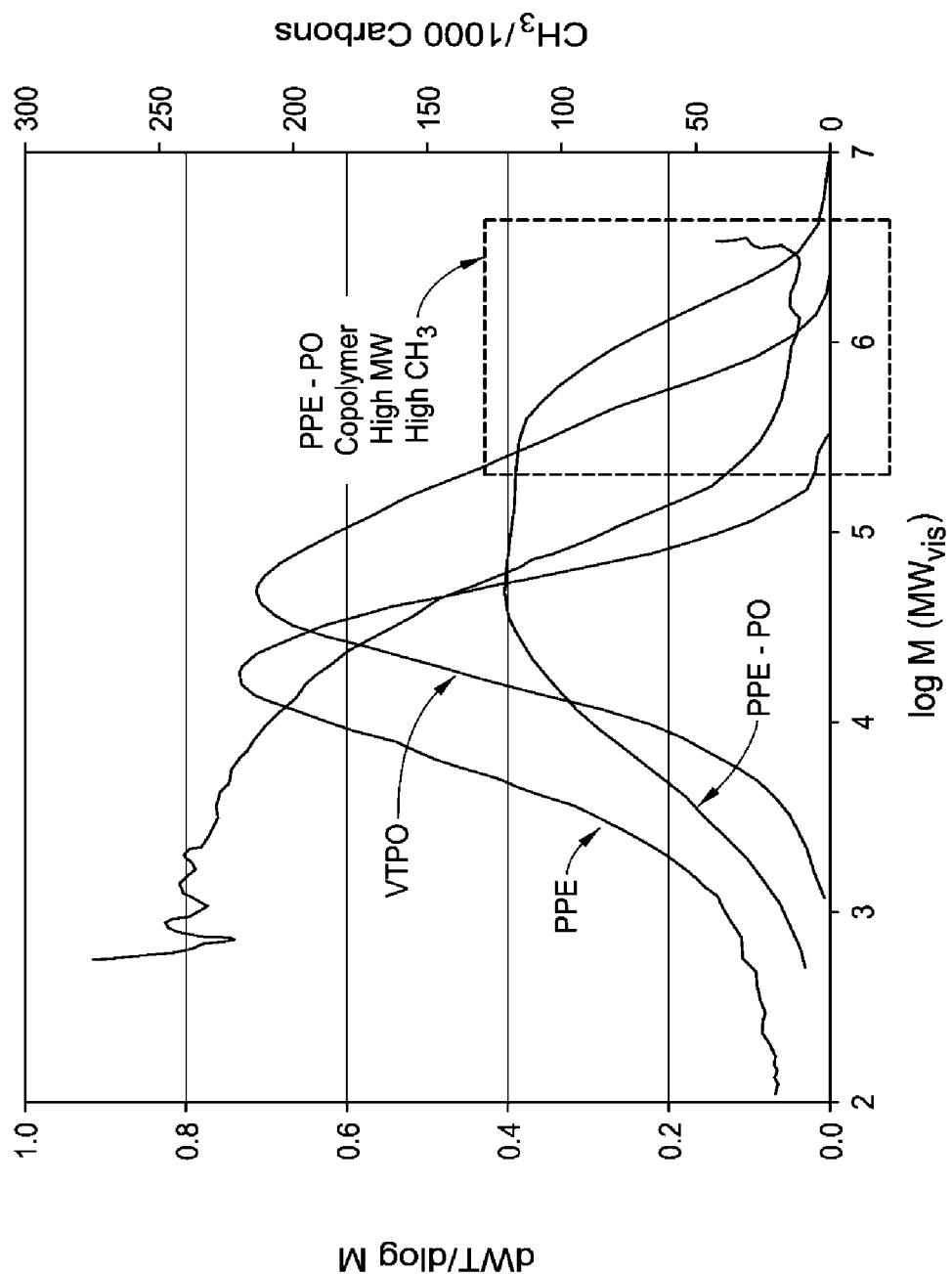
FIG. 6 is a graphical representation of GPC studies suggesting the existence of the PPE-PO composition.

GPC studies also provide evidence for the existence of the PPE-PO product. FIG. 6 is an overlay of labeled GPC traces: low molecular weight PPE; high molecular weight VTPO; the PPE-PO copolymer composition; and the $ArCH_3$ concentration ($ArCH_3$ only exists in PPE but not in PO). The fact that $ArCH_3$ appears in the high molecular weight portions of the PPE-PO copolymer is an indication of copolymer formation).

Having described the various features of the inventive PO-PAE, and methods of forming the PO-PAE, described here in numbered paragraphs is:

P1. A stabilized polyolefin-poly(arylene ether) copolymer composition comprising a poly(arylene ether) group modified as in compounds of the general formula:

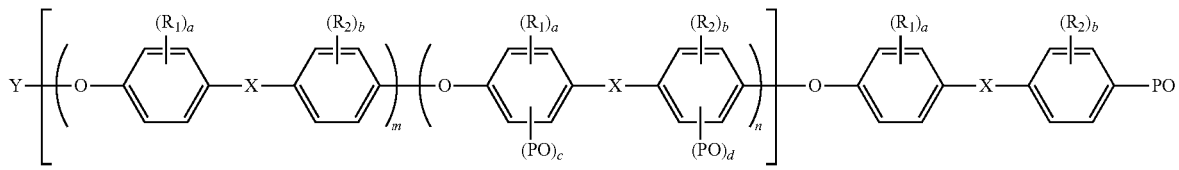

wherein Y is a chain end group with or without treatment;
X is independently an oxygen, sulfur, nitrogen, phosphorus, silicon, or carbon containing moiety;
a and b are independently 0, 1, 2, 3, or 4, and (a+b) is less than 8;
c and d are independently 0, 1, 2, 3, or 4, and (c+d) is at least 1;
n is at least 1 (or within a range from 1 to 200), m is at least 1 (or within a range from 1 to 199), and (m+n)=k, where k is within a range from 1 to 200;
$R^1$ and $R^2$ groups are independently selected from hydrogen, aryl, substituted aryl, $C_1$ to $C_{10}$ alkyl groups, hydroxyl, halogen, or $C_1$ to $C_{10}$ alkoxy; and
each PO is independently a polyolefin group.

P2. The stabilized composition of numbered paragraph 1, wherein the polyolefin group is a polyolefin selected from the group consisting of polyethylene, polypropylene, ethylene-propylene copolymer, hexene-ethylene copolymer, octene-ethylene copolymer, and combinations thereof.

P3. The stabilized composition of numbered paragraphs 1 or 2, wherein number average molecular weight of the poly (arylene ether) group is within a range of from 1,000 or 2,000 or 5,000 or 10,000 g/mole to 20,000 or 30,000 or 40,000 g/mole.

P4. The stabilized composition of any one of the previous numbered paragraphs, wherein the number average molecular weight of the polyolefin group is within a range of from 5,000 or 10,000 or 20,000 or 30,000 g/mole to 50,000 or 80,000 or 100,000 or 120,000 or 160,000 g/mole.

P5. The stabilized composition of any one of the previous numbered paragraphs, wherein Y is independently selected from the group consisting of hydrogen, alkyl, aryl, arylalkyl, alkenyl, aminoalkyl, alkylketo, carbonyl, amido, imido, siloxanyl, and silanyl.

P6. The stabilized composition of any one of the previous numbered paragraphs, wherein X is independently selected from the group consisting of oxygen, sulfur, alkyl, arylalkyl, aryl, keto, amino, amido, imido, ureido ($NH_2CONH$—), carbonyl, carbonate, sulfonyl, siloxanyl, amd silanyl.

P7. The stabilized composition of any one of the previous numbered paragraphs, wherein the decrease in the Complex Viscosity at 230° C. of the polyolefin-poly(arylene ether) copolymer is no greater than 5 or 10 or 15% after pre-heatment at 350° C. (from 0.1 to 10 rad/s).

P8. Automotive components comprising (or consisting of) the stabilized polyolefin-poly(arylene ether) copolymer composition of any one of the previous numbered paragraphs.

P9. A method to stabilize a poly(arylene ether) of any one of the previous numbered paragraphs comprising:
combining the neat or diluted poly(arylene ether) with a vinyl or vinylidene-terminated polyolefin at a temperature of at least 80 or 100 or 120° C. to form heated reaction components;
combining a Brønsted acid or Lewis acid with the heated reaction components; and
isolating the polyolefin-poly(arylene ether) copolymer composition.

P10. The method of numbered paragraph 9, wherein the vinyl or vinylidene-terminated polyolefin is a polyolefin selected from the group consisting of vinyl or vinylidene-terminated polyethylene, vinyl or vinylidene-terminated polypropylene, vinyl or vinylidene-terminated ethylene-propylene copolymer, vinyl or vinylidene-terminated hexene-ethylene copolymer, vinyl or vinylidene-terminated octene-ethylene copolymer, and combinations thereof.

P11. The method of numbered paragraph 9, wherein the number average molecular weight of the poly(arylene ether) is within a range of from 1,000 or 2,000 or 5,000 or 10,000 g/mole to 20,000 or 30,000 or 40,000 g/mole.

Also disclosed is the use of a VTPO to stabilize a PAE by combining the components with an acid catalyst to form a PO-PAE as disclosed herein.

Also disclosed is the use of a PO-PAE made as described herein in an automotive component.

For all jurisdictions in which the doctrine of "incorporation by reference" applies, all of the test methods, patent publications, patents and reference articles are hereby incorporated by reference either in their entirety or for the relevant portion for which they are referenced, including the priority document(s).

The invention claimed is:

1. A method to stabilize a poly(arylene ether) comprising:
combining a neat or diluted poly(arylene ether) with a vinyl or vinylidene-terminated polyolefin at a temperature of at least 80° C. to form heated reaction components, wherein the vinyl or vinylidene-terminated polyolefin is selected from the group consisting of vinyl or vinylidene-terminated polyethylene, vinyl or vinylidene-terminated polypropylene, vinyl or vinylidene-terminated ethylene-propylene copolymer, vinyl or vinylidene-terminated hexene-ethylene copolymer, vinyl or vinylidene-terminated octene-ethylene copolymer, and combinations thereof;
combining a Brønsted acid or Lewis acid with the heated reaction components; and
isolating a polyolefin-poly(arylene ether) copolymer composition.

2. The method of claim 1, wherein number average molecular weight of the poly(arylene ether) is within a range of from 1,000 g/mole to 40,000 g/mole.

3. The method of claim 1, wherein the number average molecular weight of the vinyl or vinylidene-terminated polyolefin is within a range of from 5,000 g/mole to 160,000 g/mole.

4. The method of claim 1, wherein the decrease in the Complex Viscosity at 230° C. of the polyolefin-poly(arylene ether) copolymer is no greater than 15% when pre-heated at 350° C. (from 0.1 to 10 rad/s).

* * * * *